No. 666,711. Patented Jan. 29, 1901.
R. STAUF.
METHOD OF DESICCATING BLOOD, &c.
(Application filed Oct. 3, 1900.)
(No Model.)
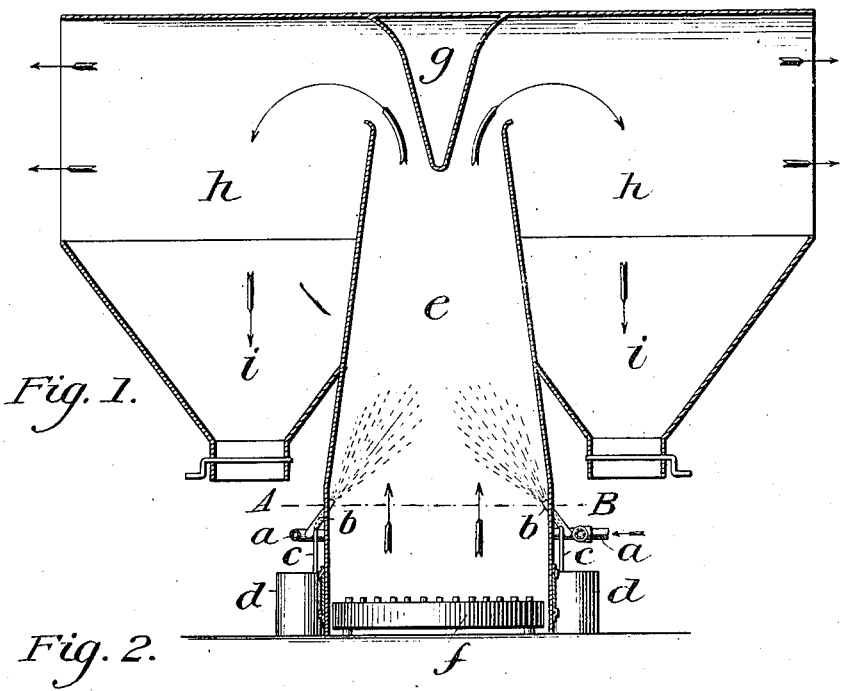
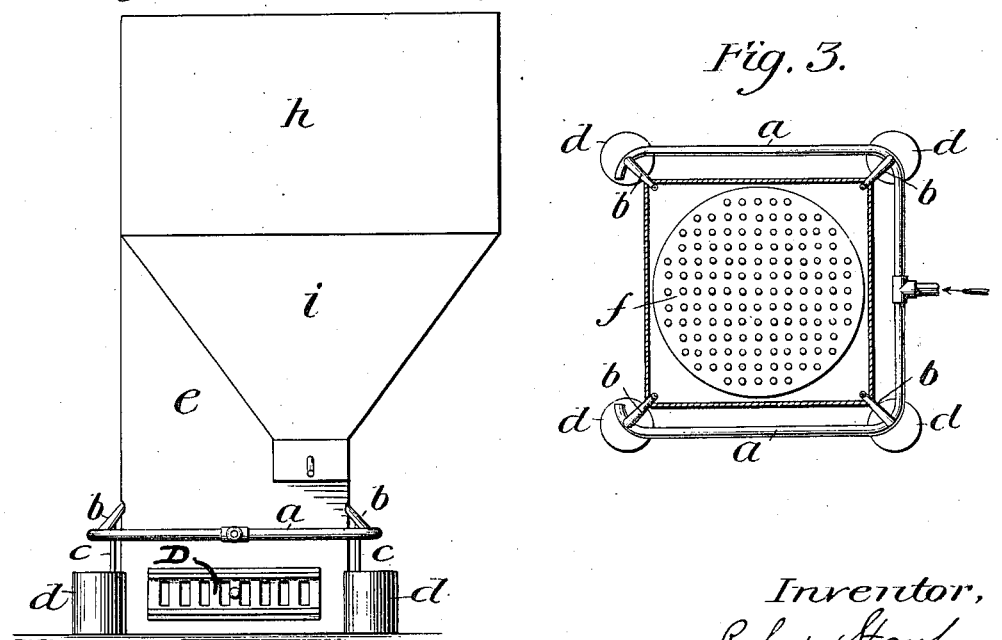

UNITED STATES PATENT OFFICE.

ROBERT STAUF, OF POSEN, GERMANY.

METHOD OF DESICCATING BLOOD, &c.

SPECIFICATION forming part of Letters Patent No. 666,711, dated January 29, 1901.

Application filed October 3, 1900. Serial No. 31,923. (No specimens.)

*To all whom it may concern:*

Be it known that I, ROBERT STAUF, a subject of the German Emperor, residing at Posen, in the German Empire, have invented certain new and useful improvements in methods of obtaining the solid constituents contained in liquids—such as blood, milk, and the like—in the form of dry powder, of which the following is a specification.

The object of this invention is a method of manufacturing preparations in the form of dry powder from liquids, such as blood, milk, and the like.

It consists, substantially, in making a very fine spray of the liquid in question and subjecting it to a desiccating process when in that condition, it being of importance that in this process the desiccation takes place at a predetermined temperature, because if the proper temperature should be exceeded the dried powder might readily be decomposed or its chemical properties changed. When the liquid is desiccated in the form of a fine spray, the temperature at which the drying takes place can be more readily regulated than when the liquid is treated in an evaporating vessel.

The means and devices for practicing the new process may be of various kinds. One suitable form of apparatus is shown in the accompanying drawings, in which—

Figure 1 is a vertical section. Fig. 2 is a side elevation. Fig. 3 is a horizontal section on line A B, Fig. 1.

The nature and operation of the apparatus are as follows: A pipe $a$ serves to supply air under pressure to the spray-nozzles $b$. The air under pressure draws the liquid to be operated upon from the vessels $d$ through tubes $c$ and projects the same in a finely-atomized condition—that is to say, as a fine spray—in oblique jets into the interior of a shaft-like casing $e$. At the lowest part of the said casing is provided a suitable source of heat—say a gas-fire $f$. The air, admitted laterally through openings provided with suitable regulating devices or registers D, is heated by the source of heat and rises. The spray of atomized liquid coming from the jets or nozzles $b$ comes in contact and mixes with the heated air, and the watery constituents of the spray are evaporated. The steam and the dry particles are carried upward by the heated air and by a cone $g$, extending into the casing $e$, are guided into chambers $h$, surrounding the shaft $e'$ in the form of a gallery, said chambers being constituted by suitable casings closed at the top. The sides of said gallery are made of woolen fabric, mill-gauze, or like pervious material, permitting the air and vapors to pass and escape into the atmosphere, while the dry powder falls down and is collected in the hoppers $i$, whence it is removed by openings fitted with suitable closing devices, such as rotary valves or the like. As this arrangement permits exact adjustment of the quantity of air used and of the heat to be produced by the heating device it is easy to maintain the temperature of the drying air at the degree best suited for economical working and such as not to destroy the properties of the dried powder.

What I claim as my invention, and desire to secure by Letters Patent, is—

The process of obtaining the solid constituents of liquids such as blood, milk, and the like, in the form of powder, said process consisting in converting the liquid into a fine spray, bringing such spray or atomized liquid into a regulated current of heated air so that the liquid constituents are completely vaporized, conveying the dry powder into a suitable collecting-space away from the air-current, and discharging the air and vapor separately from the dry powder.

In testimony whereof I have signed my name to this specification in the presence of two subscribing witnesses.

ROBERT STAUF.

Witnesses:
 HENRY HASPER,
 WOLDEMAR HAUPT.